(12) United States Patent
Tu et al.

(10) Patent No.: US 7,454,039 B2
(45) Date of Patent: Nov. 18, 2008

(54) METHOD OF PERFORMING SHAPE LOCALIZATION

(75) Inventors: Jilin Tu, Urbana, IL (US); Thomas S. Huang, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 754 days.

(21) Appl. No.: 10/889,459

(22) Filed: Jul. 12, 2004

(65) Prior Publication Data

US 2006/0008149 A1    Jan. 12, 2006

(51) Int. Cl.
*G06K 9/00* (2006.01)

(52) U.S. Cl. .................. 382/115; 382/118; 382/209; 382/278

(58) Field of Classification Search .................. 382/117, 382/118, 209, 278, 115, 282
See application file for complete search history.

(56) References Cited

U.S. PATENT DOCUMENTS

| | | | | |
|---|---|---|---|---|
| 5,719,951 A * | 2/1998 | Shackleton et al. | ......... | 382/118 |
| 5,774,591 A | 6/1998 | Black et al. | ................. | 382/236 |
| 5,951,119 A * | 9/1999 | Eckert | ..................... | 303/113.3 |
| 6,044,168 A * | 3/2000 | Tuceryan et al. | ............ | 382/118 |
| 6,052,132 A * | 4/2000 | Christian et al. | ............ | 345/474 |
| 6,400,835 B1 * | 6/2002 | Lemelson et al. | ........... | 382/118 |
| 6,504,942 B1 | 1/2003 | Hong et al. | .................. | 382/103 |
| 6,556,196 B1 * | 4/2003 | Blanz et al. | ................. | 345/419 |
| 6,664,956 B1 * | 12/2003 | Erdem | ........................ | 345/419 |
| 6,747,652 B2 * | 6/2004 | Inoue et al. | ................. | 345/474 |
| 6,807,290 B2 * | 10/2004 | Liu et al. | .................... | 382/118 |
| 6,879,709 B2 * | 4/2005 | Tian et al. | ................... | 382/118 |
| 6,919,892 B1 * | 7/2005 | Cheiky et al. | .............. | 345/473 |
| 6,931,596 B2 * | 8/2005 | Gutta et al. | ................. | 715/728 |
| 2003/0031344 A1 | 2/2003 | Maurer et al. | .............. | 382/103 |

FOREIGN PATENT DOCUMENTS

WO    02/093493 A1    11/2002

OTHER PUBLICATIONS

T. Cootes and C. Taylor, "Statistical Models of Appearance for Computer Vision". Technical report, University of Manchester, 2000.
T. Cootes and C. Taylor, "Constrained Active Appearance Models". In *Proceedings of the 8th ICCV*, Jul. 2001.

(Continued)

*Primary Examiner*—Yosef Kassa
(74) *Attorney, Agent, or Firm*—Greer, Burns & Crain, Ltd.

(57) ABSTRACT

A method for performing shape localization in an image includes deriving a model shape from a database of a plurality of sample shapes. The model shape is defined by a set of landmarks. The method further includes deriving a texture likelihood model of present sub-patches of the set of landmarks defining the model shape in the image, and proposing a new set of landmarks that approximates a true location of features of the shape based on a sample proposal model of the present sub-patches. A CONDENSATION algorithm is used to derive the texture likelihood model and the proposed new set of landmarks.

26 Claims, 5 Drawing Sheets

OTHER PUBLICATIONS

Ce Liu, Heung-Yeung Shum, Changshui Zhang, "Hierarchical Shape Modeling for Automatic Face Localization", *ECCV* (2) 2002: 687-703.

X.W. Hou, S.Z. Li, H.J. Zhang, Q.S. Cheng. "Direct Appearance Models". In *Proceedings of IEEE International Conference on Computer Vision and Pattern Recognition*. Hawaii: Dec. 2001.

Michael Isard and Andrew Blake, "Condensation—conditional density propagation for visual tracking", *Int. J. Computer Vision*, 29, 1, 5-28, (1998).

A. Yullie, "Feature extraction from faces using deformable templates," *Int. Journal of Computer Vision*, 8(2):99-111, 1992.

T. Leung, M. Burl, and P. Perona, "Finding Faces in Cluttered Scenes using Random Labeled Graph Matching," *In Proceedings of the 5th ICCV*, Jun. 1995.

B. Moghaddam and A. Pentland, "Probabilistic visual learning for object representation," in *IEEE Transactions on Pattern Analysis and Machine Intelligence*, 1997, vol. 7, pp. 696-710.

G. Edwards, T. Cootes, and C. Taylor, "Face recognition using active appearance models," in *Proceedings of the European Conference on Computer Vision*, 1998, vol. 2, pp. 581-695.

Hongcheng Wang and Narendra Ahuja, "Facial expression decomposition," in *International Converence on Computer Vision*, 2003, vol. 1, pp. 958-965.

V. Blanz and T. Vetter, "A morphable model for the synthesis of 3d faces, " in *SIGGRAPH '99 Conference Proceedings*, 1999, pp. 187-194.

Zhen Wen, Zicheng Liu, and Thomas Huang, "Face relighting with radiance environment maps," in *Proc. Intl. Conf. On Computer Vision and Pattern Recognition (CVPR)*, 2003, vol. 2, pp. 158-165.

Hai Tao and Thomas Huangm, "Explanation-based facial motion tracking using a piecewise bezier volume deformation model," in *Proc. IEEE Comput. Vision and Patt. Recogn., CVPR'99*, 1999, vol. 1, pp. 611-617.

Markus Kampmann, "Automatic 3-d face model adaptation for model-based coding of videophone sequences, " in *IEEE Transaction on Circuits and Systems for Video Technology*, 2002, vol. 3, pp. 172-182.

T. Cootes, and C. Taylor, "Active shape models," in *3rd British Machine Vision Conference*, D. Hogg Boyle and R., Eds., Springer-Verlag, 1992, p. 266275.

S. Romdhani, S. Gong, and A. Psarou, "A multi-view non-linear active shape model using kernel pca," in *Proceedings of the 1999 British Machine Vision Conference*, 1999, pp. 483-492.

A. Blake and M. Isard, Active Contours, Springer 98.

K. Sung and T. Poggio, "Example-based learning for view-based human face detection," in *IEEE Transactions on Pattern Analysis and Machine Intelligence*, 1998, vol. 1, pp. 39-51.

Z.Q. Zhang, L. Zhu, S.Z. Li, and H.J. Zhang, "Real-time multi-view face detection," in *Proceedings of The 5th International Conference on Automatic Face and Gesture Recognition*, Washington, DC. USA, 2002, pp. 20-21.

Yoav Freund and Robert E. Schapire, "A decision-theoretic generalization of on-line learning and an application to boosting," in *Computational Learning Theory: Eurocolt'95*, pp. 23-37. Springer-Verlang, 1995.

Hueng-Yeung Shum Ce Liu, "Kullback-leibler boosting," in *IEEE on Computer Vision and Pattern Recognition*, 2003, vol. 1, pp. 587-594.

A. Fisher, "The use of multiple measurements in taxo-nomic problems," *Annals of Eugenics*, vol. 7, pp. 179-188, 1936.

S. Mika, G. Rtsch, J. Weston, B. Schlkopf, and pages. K.-R. Mller . . In, editors, "Fisher discriminant analysis with kernels," in *IEEE, Neural Networks for Signal Processing*, E. Wilson Y.-H. Hu, J. Larsen and S. Douglas, Eds., 1999, vol. IX. pp. 41-48.

\* cited by examiner

METHOD OF PERFORMING SHAPE LOCALIZATION

FIELD OF THE INVENTION

The present invention is in the image analysis field. The invention particularly concerns performing face localization based on a conditional density propagation (CONDENSATION) framework.

BACKGROUND OF THE INVENTION

Face localization detects the locations of predefined detailed facial features and outlines in images. It plays important roles in human face related applications. For example, after faces of different size, shape, pose and expression are aligned, face variations caused by different factors, such as human identity, facial expressions, illumination, etc., can be extracted independently for face recognition, facial expression analysis, and face modeling and synthesis. Face localization is also employed in visual face tracking and model based video coding, in which the face model needs to be aligned with the first video frame so that facial geometry and head pose can be customized. Face localization also plays important roles, for example, in computer vision applications for human-machine interaction. It provides two-dimensional (2D) facial geometry information, which allows face recognition to align faces of different size, shape, pose and expression during training and evaluation stages, so that face variations caused by human identity is modeled better and higher recognition rate can be achieved.

In recent years, some have proposed techniques to do face localization automatically. In other words, the locations of predefined facial features and outlines are automatically detected and returned in an image in which the upright frontal view of a human face in arbitrary scene, under arbitrary illumination, and with typical facial expressions is presented. In one known technique, facial features are extracted using deformable template matching, which models facial features and outlines as parametrized mathematical model (e.g., piecewise parabolic/quadratic template) and tries to minimize some energy function that defines the fitness between the model and the facial outlines in the image with respect to the model parameters. In another known technique, shape statistic model is proposed which models the spatial arrangement of facial features statistically, and is used to localize the facial features from a consternation of facial feature candidates calculated using multi-orientation, multi-scale Gaussian derivative filters.

SUMMARY OF THE INVENTION

The present invention is directed to a method for performing shape localization in an image. The method includes deriving a model shape, which is defined by a set of landmarks, from a database of a plurality of sample shapes. A texture likelihood model of present sub-patches of the set of landmarks defining the model shape in the image is derived, and a new set of landmarks that approximates a true location of features of the shape based on a sample proposal model of the present sub-patches at the set of landmarks, is then proposed. A CONDENSATION algorithm is used to derive the texture likelihood model and the proposed new set of landmarks.

DETAILED DESCRIPTION OF THE PREFERRED EMBODIMENTS

Figure 1:
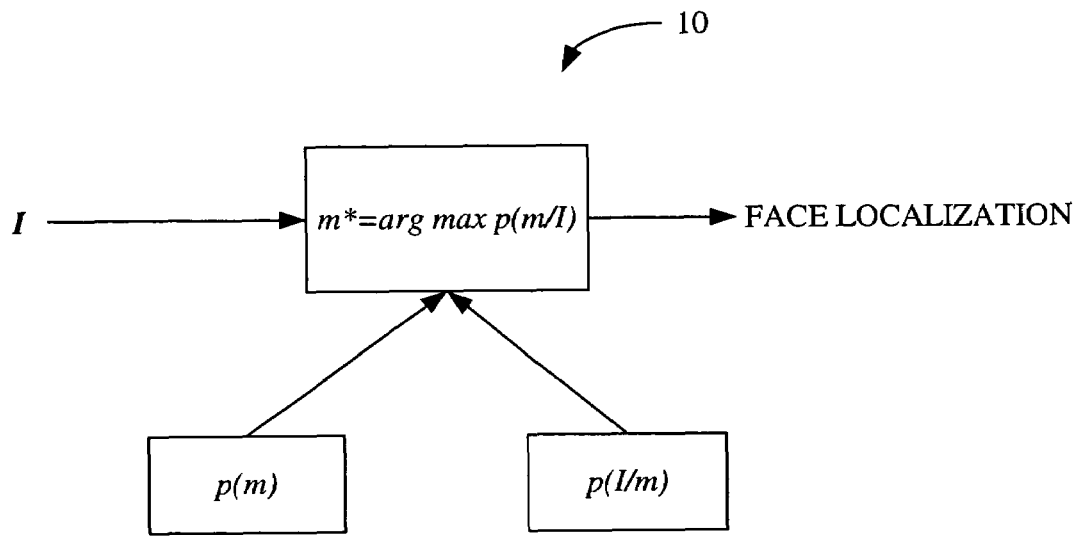
FIG. 1 is a diagram illustrating face localization formulated in a Bayesian framework.

Generally, face localization can be formulated in a Bayesian framework as shown in FIG. 1. Given an image I and a predefined face model m, the goal, i.e., the location of facial features, can be formulated as m*=arg max p(m|I)=arg max p(I|m) p(m), where p(m) is a prior probabilistic distribution of a model, and p(I|m) is some local texture likelihood distribution given a specific face model.

Figure 2:
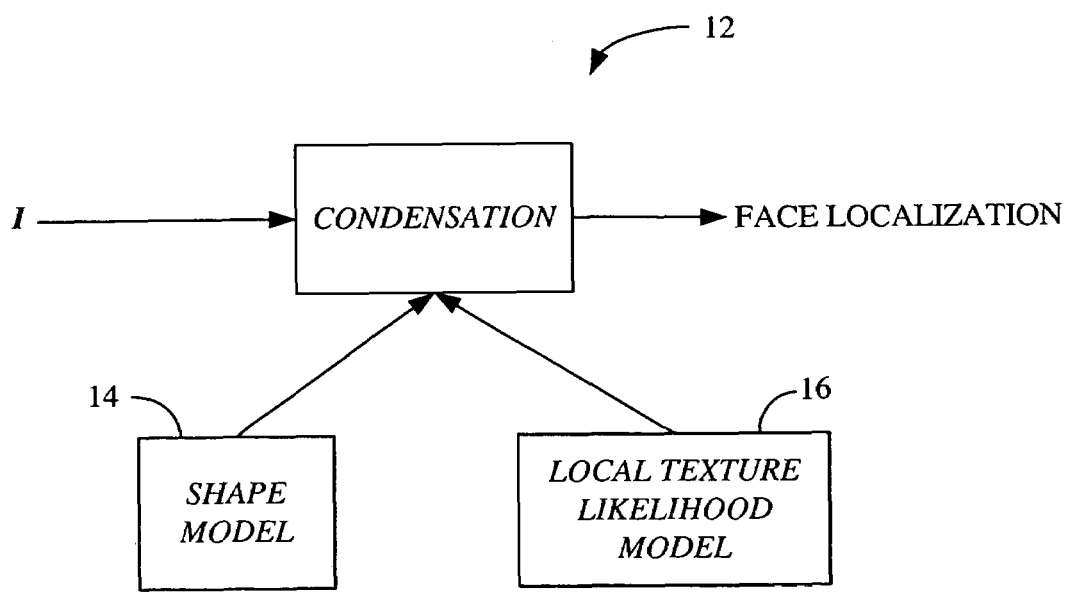
FIG. 2 is a diagram illustrating face localization in a CONDENSATION framework of the present invention.

In the present invention, a hierarchical face localization algorithm is proposed based on a conditional density propagation (CONDENSATION) approach. The face outline, i.e., the a prior distribution for intrinsic model parameters, is modeled with Active Shape Model (ASM), with local texture likelihood model (p(I|m)) at each landmark defining features of a face outline modeled with Mixture of Gaussian. By formulating the face localization problem into a Maximum a posterior Probability (MAP) problem, a CONDENSATION framework is employed to solve this problem, as shown in FIG. 2. To improve the searching speed and robustness, a hierarchical approach is employed.

As the face localization problem is formulated as a MAP problem, the CONDENSATION algorithm, which is known to those skilled in the art, provides a tool to approximate the unknown distribution in high dimensional space based on a factored random-sampling approach. The idea of factored sampling is that the a posterior probabilistic distribution or posterior p(m|I) can be modeled by a set of N samples $\{s^{(n)}\}$ drawn from the a prior probabilistic distribution, or prior p(m) with corresponding weight $\pi^{(n)}=p(I|m=s^{(n)})$ evaluated from the local texture likelihood distribution p(I|m). The expectation of function h(X) with respect to the posterior p(m|I) can be approximated as $$E_f(h(X)) = \lim_{N \to \infty} \frac{\sum_{k=1}^{N} h(s^{(k)})\pi^{(k)}}{\sum_{k=1}^{N} \pi^{(k)}} \quad (1)$$

However, this approach may not be practical as many samples drawn from the model prior p(m) might be wasted if corresponding $\pi^{(k)}$ is too small and does not make contribution to the computation. In one embodiment of the invention, this problem is reformulated in a probabilistic framework of CONDENSATION propagation so that all samples have significant observation probability, and thus sampling efficiency is improved. Denoting $m_i$ to be the state vector at iteration step i, and $I_i$ to be the observation at iteration i, $$p(m_i|I_i)=p(m_i|I_i, I_{i-1}) \sim p(I_i|m_i)p(m_i|I_{i-1})$$

is obtained.

Therefore, starting from the initial guess of N samples of models, a new set of random samples $\{m_i^{(k)}, k=1, \ldots, N\}$ is drawn from the conditional a prior $p(m_i|I_{i-1})$, and weighted by their measurements $\pi_i^{(k)} = p(I_i|m=m_i^{(k)})$. This iterates until convergence condition satisfies. Accordingly, to make CONDENSATION framework 12 complete for the task of face localization, the a prior model p(m) representing the model face shape 14 or geometry, the local texture likelihood model $p(I_i/m_i)$ 16 representing the features of a face shape such as the eyes, nose, mouth, etc., and a conditional a prior model $p(m_i/I_{i-1})$ representing the sample proposal model, are required (see FIG. 2).

Figure 3:
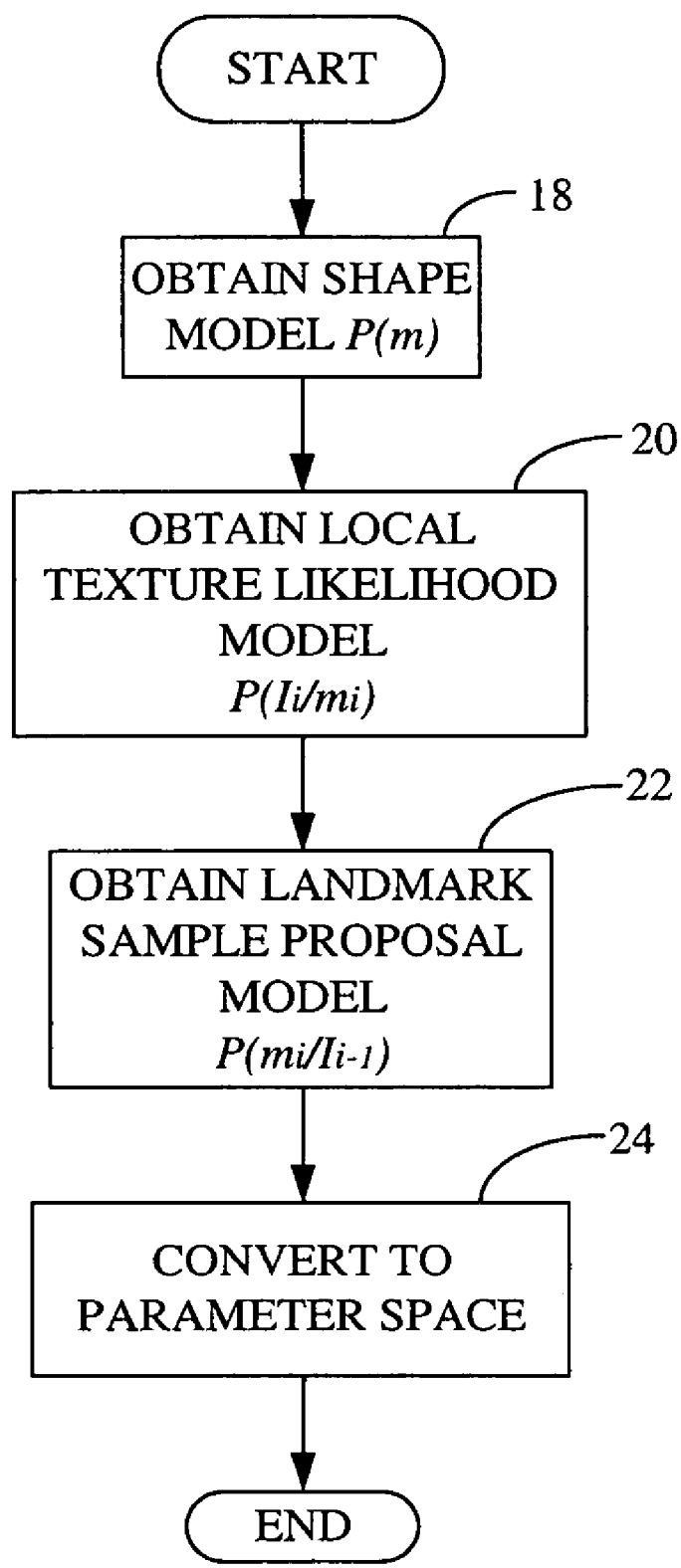
FIG. 3 is a flowchart illustrating the process of performing face localization in accordance with one embodiment of the present invention.
Figure 4:
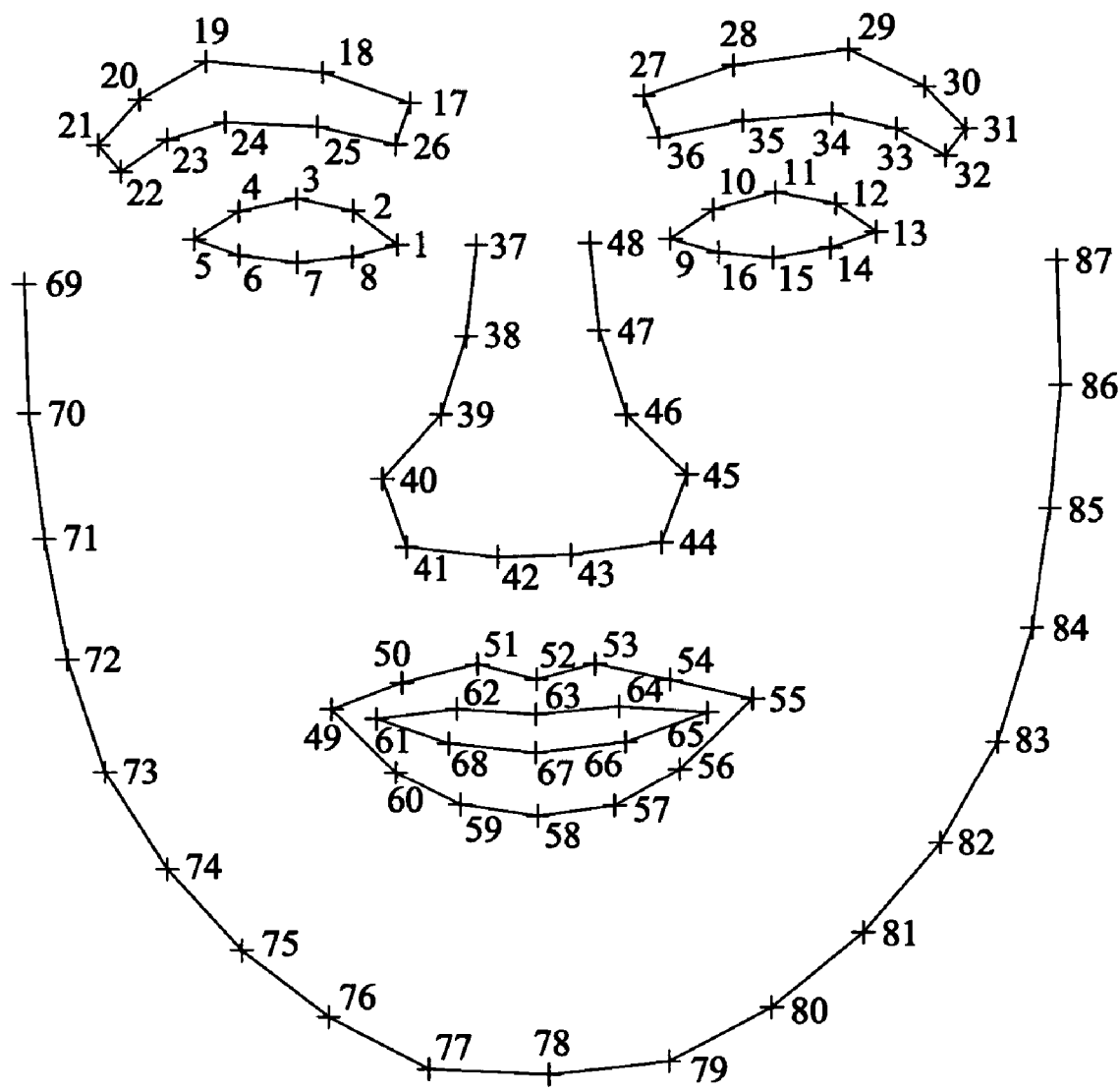
FIG. 4 is an example of a face shape defined by a set of landmarks.
Figure 5:
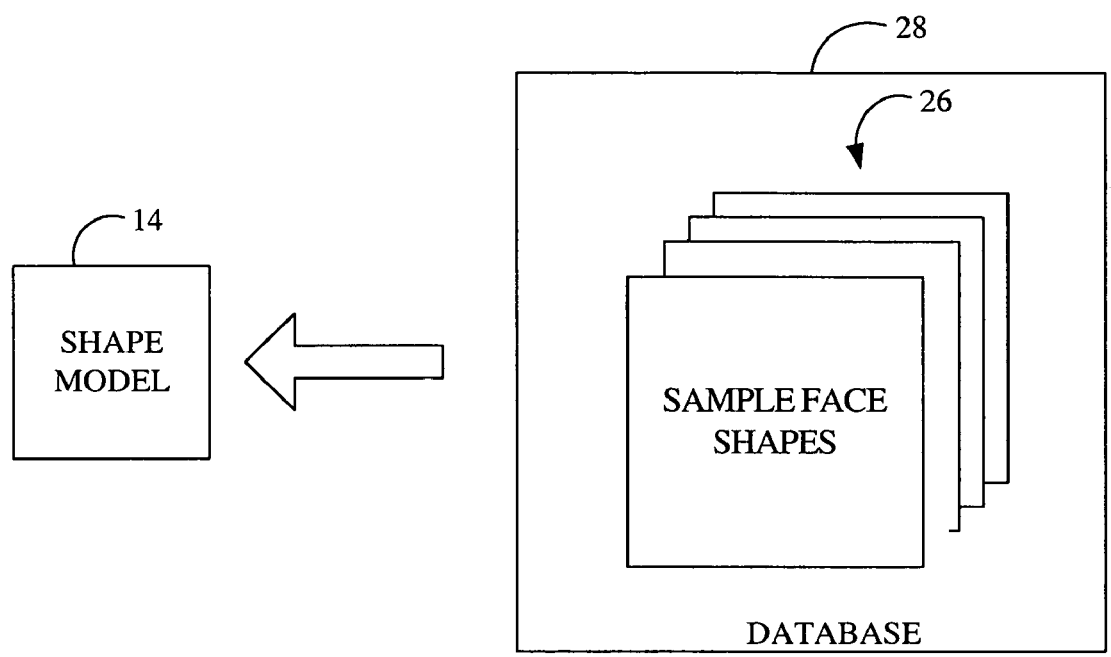
FIG. 5 is a diagram illustrating the manner in which a model face shape is obtained from a database of sample face shapes.

Turning now to FIG. 3 and in one embodiment of the invention, the active shape model (ASM) is used to describe a two-dimensional (2D) human face geometry, i.e. the shape model p(m) 14 (block 18). The landmarks of the shape are represented as a vector $S=(x_1, x_2, \ldots, x_K, y_1, y_2, \ldots y_K)^T$ of length 2K, where K is the number of manually labeled landmarks defining a face, for example, 87 marks as in FIG. 4. Given a set of manually labeled sample face shapes 26 in a database 28, (best shown in FIG. 5) the labeled face shapes are aligned to the same scale and orientation and normalized using Procrustes analysis (PCA), for example. PCA is applied to the face vectors, and the eigenspace of the face variations is defined by the eigenvectors.

By taking the first k principal components, (e.g., k=15 to preserve 85% variations), a face shape can be modeled as $$S = \bar{S} + Uw, \quad (2)$$

where $\bar{S}$ is the mean shape of the face, and $U_{2K \times k}$ is the eigenvector matrix, and $w_{k \times 1}$ is the parameter vector that define the face shape model 14. The a prior model probability p(m) can be obtained by learning a mixture of Gaussian model after projecting the face vectors in the k dimensional ASM eigenspace.

The shape vector S can also be rearranged into another form as $$\hat{S} = \left\{ \begin{pmatrix} x_1 \\ y_1 \end{pmatrix}, \begin{pmatrix} x_2 \\ y_2 \end{pmatrix}, \ldots, \begin{pmatrix} x_k \\ y_k \end{pmatrix} \right\},$$

where $(\hat{\ })$ denotes the rearrangement operation of shape vector. As the face in image may be subject to scaling, rotation and translation, the relation can be denoted as $$\hat{S}_{image} = s \begin{bmatrix} \cos(\theta) & \sin(\theta) \\ -\sin(\theta) & \cos(\theta) \end{bmatrix} \hat{S} + T, \quad (3)$$

where s is scaling factor, $\theta$ is the angle of rotation, and $$T = \begin{bmatrix} T_x \\ T_y \end{bmatrix}$$

is the translation of the face in the image. Thus, the landmark set of a face in image can be represented as a compact parameter model $m=(s, \theta, T, w)$. The goal of face localization thus becomes to recover the model parameter m given a face image.

Given a sample in the model parameter space $m=m_i$ at iteration i, the shape vector of the landmark set in image can be retrieved by inverse transformation of equations (2) and (3) (block 20). A sub-patch of each landmark (i.e., a small area surrounding each landmark) in the image is then cropped or cut to a specified size. Letting $\Gamma_j$ denote the sub-patch of landmark j, then the local texture likelihood model is defined as $$p(I|m) = p(\Gamma_1, \Gamma_2, \ldots, \Gamma_K) = \prod_{j=1}^{K} p(\Gamma_j),$$

supposing the texture of each landmark is independent. To learn the texture likelihood $p(\theta_j)$ of landmark i from training images, i.e., the sample face shapes 26 from the database 28, the sub-patch of landmark i in the training images is collected, and projected into low dimensional texture eigenspace. Mixture of Gaussian model is learned from these sub-patch projections to represent the distribution.

The sample proposal model $p(m_i|I_{i-1})$ enables the samples $\{m_i\}$ in the model parameter space to migrate toward regions of higher likelihood distribution according to their evaluation of the local observation of facial features in image (block 22). The collection of local observation of facial features image at iteration i can be represented as $I_i = \{\Gamma_1^{(i)}, \Gamma_2^{(i)}, \ldots, \Gamma_K^{(i)}\}$. By regarding the shape model as landmark set $\{p_1, p_2, \ldots, p_K\}$ and the proposal model for landmark j can be represented as $p(p_j^{(i)}|\Gamma_j^{(i)})$, then $$p(m_i|I_{i-1}) = p(p_1^{(i)}, p_2^{(i)}, \ldots, p_K^{(i)} | \Gamma_1^{(i-1)}, \Gamma_2^{(i-1)}, \ldots, \Gamma_K^{(i-1)})$$

$$= \prod_{j=1}^{K} p(p_j^{(i)} | \Gamma_j^{(i-1)})$$

is obtained by assuming independence of the proposal model of each landmark.

The proposal model of each landmark is formulated as $$p(p_j|\Gamma_j) = \frac{p(p_j = (x, y) | \Gamma_{(x,y)})}{\sum_{(x,y) \in \Gamma_j} p(p_j = (x, y) | \Gamma_{(x,y)})},$$

where $\Gamma_{(x, y)}$ means a subpatch centered at (x, y).

According to Bayesian rule, $$p(p_j=(x,y)|\Gamma_{(x,y)}) \sim p(\Gamma_{(x,y)}|p_j=(x,y))p(p_j=(x,y)) = p(\Gamma_{(x,y)})p(p_j=(x,y)),$$

where $p(\Gamma_{(x, y)})$ is the texture likelihood of landmark j at location (x, y), and $p(p_j=(x, y))$ can be simply modeled as a uniform distribution in the image.

After the new model sample is proposed as $\{p_1^{(i)}, p_2^{(i)}, \ldots, p_K^{(i)}\}$, the derivative is represented as $$\Delta S^{(i)} = (\Delta x_1^{(i)}, \Delta x_2^{(i)}, \ldots, \Delta x_K^{(i)}, \Delta y_1^{(i)}, \Delta y_2^{(i)}, \ldots, \Delta y_K^{(i)})^T$$

$$= (x_1^{(i)}, x_2^{(i)}, \ldots, x_K^{(i)}, y_1^{(i)}, y_2^{(i)}, \ldots, y_K^{(i)})^T -$$

$$(x_1^{(i-1)}, x_2^{(i-1)}, \ldots, x_K^{(i-1)}, y_1^{(i-1)}, y_2^{(i-1)}, \ldots, y_K^{(i-1)})^T$$

$$S = \bar{S} + Uw$$

$$= (\bar{S}\ U)\begin{pmatrix} 1 \\ w \end{pmatrix}$$

to convert from a landmark space to a model parameter space (block 24).

By supposing the rotation angle is very small, the following approximation is obtained $$\begin{pmatrix} X_i \\ Y_i \end{pmatrix} = s \begin{pmatrix} \cos(\theta) & \sin(\theta) \\ -\sin(\theta) & \cos(\theta) \end{pmatrix} \begin{pmatrix} \overline{S}_i^x & U_i^x \\ \overline{S}_i^y & U_i^y \end{pmatrix} \begin{pmatrix} 1 \\ w \end{pmatrix} + \begin{pmatrix} T_x \\ T_y \end{pmatrix}$$

$$= \begin{pmatrix} \cos(\theta) & \sin(\theta) \\ -\sin(\theta) & \cos(\theta) \end{pmatrix} \begin{pmatrix} \overline{S}_i^x & U_i^x \\ \overline{S}_i^y & U_i^y \end{pmatrix} \begin{pmatrix} s \\ sw \end{pmatrix} + \begin{pmatrix} T_x \\ T_y \end{pmatrix}$$

$$\approx \begin{pmatrix} 1 & \theta \\ -\theta & 1 \end{pmatrix} \begin{pmatrix} \overline{S}_i^x & U_i^x \\ \overline{S}_i^y & U_i^y \end{pmatrix} w' + \begin{pmatrix} T_x \\ T_y \end{pmatrix}$$

By taking derivative of $X_i$, $Y_i$ with respect to $\theta$, T, and w', we have the following equation $$\begin{pmatrix} dX_i \\ dY_i \end{pmatrix} = \left[ \begin{pmatrix} \overline{S}_i^y & U_i^y \\ \overline{S}_i^x & -U_i^x \end{pmatrix} w' \vdots \begin{matrix} 1 & 0 \\ 0 & 1 \end{matrix} \vdots \begin{pmatrix} 1 & \theta \\ -\theta & 1 \end{pmatrix} \begin{pmatrix} \overline{S}_i^x & U_i^x \\ \overline{S}_i^y & U_i^y \end{pmatrix} \right] \begin{pmatrix} d\theta \\ \cdots \\ dT \\ \cdots \\ dw' \end{pmatrix}. \quad (4)$$

The above equation (4) enables $\Delta S^{(i)}$ to be converted into derivates in parameter space $\Delta m^{(i)} = (\Delta s^{(i)}, \Delta \theta^{(i)}, \Delta T^{(i)}, \Delta w^{(i)})$, and $m^{(i+1)} = m^{(i)} + a\Delta m^{(i)}$ for some $0 < a <= 1$.

Figure 6:
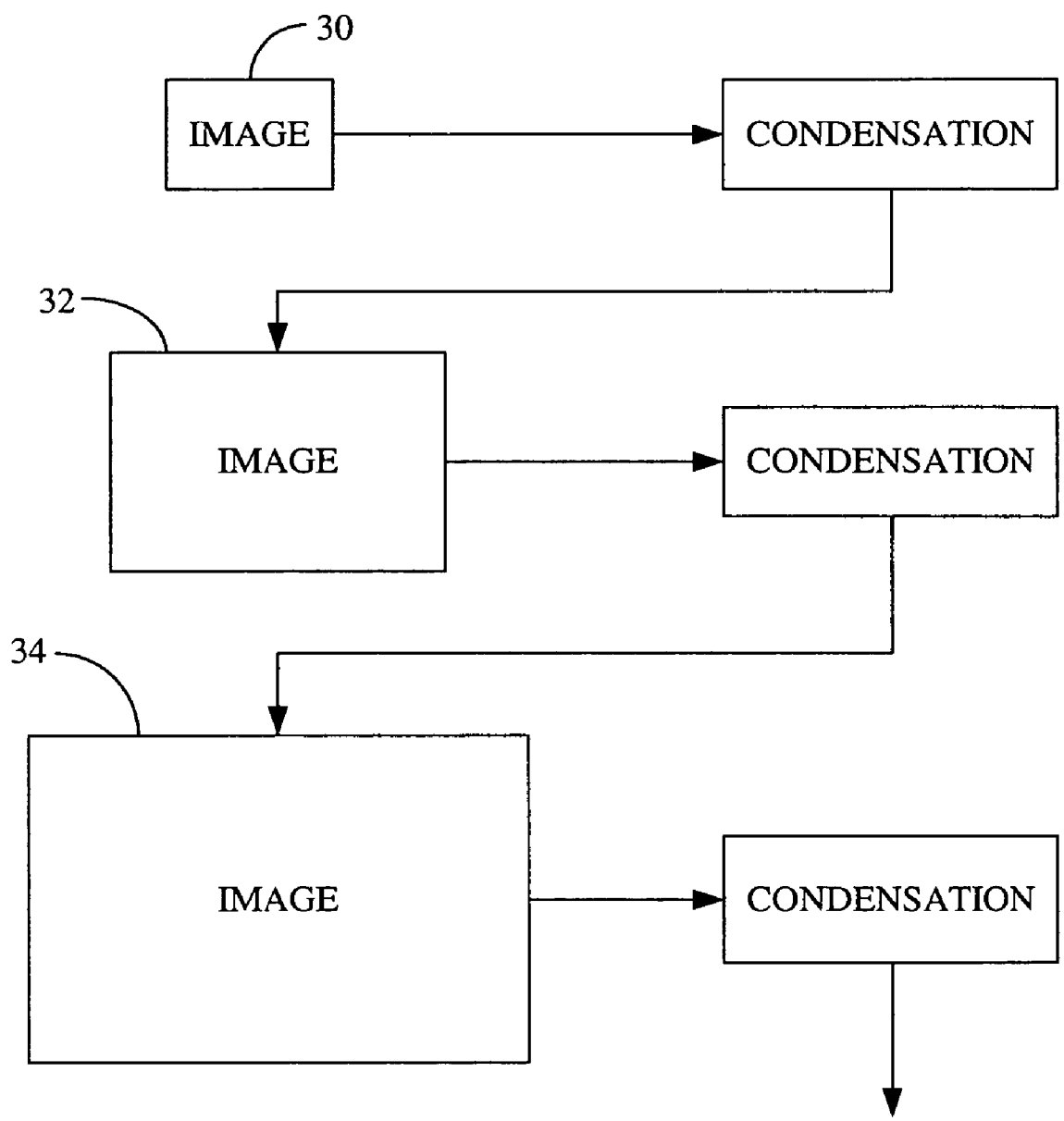
FIG. 6 is a diagram illustrating the hierarchical method of performing the CONDENSATION algorithm in accordance with the present invention.

Turning now to FIG. 6 and in accordance with an exemplary embodiment of the invention, a face in an image is searched hierarchically, i.e., in a coarse-to-fine manner. First, the image is down-sampled, i.e., the size of the image is reduces into, for example, a 3-layer-pyramid. The CONDENSATION algorithm as described above starts from the image at lowest resolution, and gradually refines the search in image at higher resolution. Second, the number of landmarks used in sample proposal model $p(m_t|I_{t-1})$ increases as the resolution of image increases. For example, for a face defined by 87 landmarks, the system can start with 10 landmarks (corresponding to strong facial features that are perceptible at lowest resolution) at lowest resolution 30, and increase to 60 landmarks for intermediate level 32, and all 87 landmarks for the finest level 34. Third, the dimension of shape eigen-space also increases when the resolution of image increases. At the lowest resolution 30, the dimension of eigen-space might only be 1, for example. It then increases to, for example, 7 at the intermediate level 32, and finally reaches 15 at the finest resolution 34. This design largely improves the computation efficiency, and prevents the search from local minima.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

The invention claimed is:

1. A method for performing face shape localization in an image, comprising:
  deriving a model face shape from a database of a plurality of sample face shapes, said model face shape being defined by a set of landmarks;
  deriving a texture likelihood model of present sub-patches of said set of landmarks defining said model face shape in the image; and
  proposing a new set of landmarks that approximates a true location of features of the face shape based on a sample proposal model of said present sub-patches;
  wherein said deriving said texture likelihood model and said proposing said new set of landmarks are conducted using a CONDENSATION algorithm; and
  said model face shape is derived from a prior probabilistic distribution of a predefined model p(m),
  said texture likelihood model of said present sub-patches is derived from a local texture likelihood distribution model p(I|m), and
  said sample proposal model is derived based on a texture likelihood model of subsequent sub-patches of a set of landmarks in the image at proposed locations in a vicinity of said present sub-patches of said present set of landmarks.

2. The method as defined in claim 1, wherein the a prior probabilistic distribution of a predefined model p(m) describes a 2-dimensional shape represented as a vector, $$S = (x_1, x_2, \ldots, x_K, y_1, y_2, \ldots, y_K)^T$$

of length 2K, where K is a number of landmarks that define said face shape.

3. The method as defined in claim 2, wherein said face shape is modeled as a vector $$S = \overline{S} + Uw,$$

when aligned with at least one of a plurality of manually labeled shape images by taking a first k principal components, where $\overline{S}$ is a mean shape, and $U_{2K \times k}$ is an eigenvector matrix, and $w_{k \times 1}$ is a parameter vector that define said shape S.

4. The method as defined in claim 3, wherein the a prior probabilistic distribution of a predefined model p(m) is obtained by learning a mixture of Gaussian model after projecting said shape vector S in the k dimensional active shape model (ASM) eigenspace.

5. The method as detined in claim 3 wherein, said shape vector S is rearranged as $$\hat{S} = \left\{ \begin{pmatrix} x_1 \\ y_1 \end{pmatrix}, \begin{pmatrix} x_2 \\ y_2 \end{pmatrix}, \ldots, \begin{pmatrix} x_{k'} \\ y_{k'} \end{pmatrix} \right\},$$

where $(\hat{\cdot})$ denotes the rearrangement operation of elements in the shape vector.

6. The method as defined in claim 5 wherein, said shape vector S is denoted as $$\hat{S}_{image} = s \begin{bmatrix} \cos(\theta) & \sin(\theta) \\ -\sin(\theta) & \cos(\theta) \end{bmatrix} \hat{S} + T,$$

where S is a scaling factor, $\theta$ is an angle of rotation, and $$T = \begin{bmatrix} T_x \\ T_y \end{bmatrix}$$

is the translation in the image, wherein the landmarks of the face shape in image is represented as parameter model m = (s, $\theta$, T, w).

7. The method as defined in claim 1, wherein the local texture likelihood distribution model p(I|m) is defined as $$p(I \mid m) = p(\Gamma_1, \Gamma_2, \ldots, \Gamma_K) = \prod_{j=1}^{K} p(\Gamma_j),$$

supposing the texture of each landmark is independent, and where $\Gamma_j$ denotes a sub-patch of landmark j defining a two-dimensional shape;

wherein a texture likelihood $p(\Gamma_j)$ of landmark i is independently learned as a Mixture of Gaussian model of sub-patches of each landmark cropped from a plurality of manually labeled training images in the database projected into their customized feature subspaces.

8. The method as defined in claim 7, wherein $$I_1 = \{\Gamma_1^{(i)}, \Gamma_2^{(i)}, \ldots, \Gamma_K^{(i)}\}$$

is a collection of local observation of shape features in image at interation i, and $$p(m_i \mid I_{i-1}) = p(p_1^{(i)}, p_2^{(i)}, \ldots, p_K^{(i)} \mid \Gamma_1^{(i-1)}, \Gamma_2^{(i-1)}, \ldots, \Gamma_K^{(i-1)})$$

$$= \prod_{j=1}^{K} p(p_j^{(i)} \mid \Gamma_j^{(i-1)}),$$

by regarding a predetined model $\{p_1, p_2, \ldots, p_K\}$ as a landmark set, and assuming independence of a $p(m/I_{i-1})$ of each of said landmark $p(p_j^{(i)} \mid \Gamma_j^{(i)})$;

said $p(m/I_{i-1})$ of each landmark is formulated as $$p(p_j \mid \Gamma_j) = \frac{p(p_j = (x, y) \mid \Gamma_{(x,y)})}{\sum_{(x,y) \in \Gamma_j} p(p_j = (x, y) \mid \Gamma_{(x,y)})},$$

where $\Gamma_{(x,y)}$ means a subpatch centered at $(x, y)$; and $$p(p_j=(x,y) \mid \Gamma_{(x,y)}) \sim p(\Gamma_{(x,y)} \mid p_j=(x,y))p(p_j=(x,y)) = p(\Gamma_{(x,y)})p(p_j=(x,y)),$$

where $p(\Gamma_{(x,y)j})$ is a texture likelihood of landmark j at location $(x, y)$, and $p(p_j=(x, y))$ is modeled as a uniform distribution in the image.

9. The method as defined in claim 8, wherein the formula $$p(p_j \mid \Gamma_j) = \frac{p(p_j = (x, y) \mid \Gamma_{(x,y)})}{\sum_{(x,y) \in \Gamma_j} p(p_j = (x, y) \mid \Gamma_{(x,y)})}$$

for the proposal model of each landmark is converted to model parameter space expressed by an equation, $$\Delta m^{(i)} = (\Delta s^{(i)}, \Delta \theta^{(i)}, \Delta T^{(i)}, \Delta w^{(i)}), \text{ and } m^{(i+1)} = m^{(i)} + a \Delta m^{(i)} \text{ for some } 0 < a \leq 1.$$

10. The method as defined in claim 9, wherein said model parameter space equation is obtained from a new model sample proposed as $$\{p_1^{(i)}, p_2^{(i)}, \ldots, p_k^{(i)}\},$$

$$\Delta S^{(i)} = (\Delta x_1^{(i)}, \Delta x_2^{(i)}, \ldots, \Delta x_k^{(i)}, \Delta y_1^{(i)}, \Delta y_2^{(i)}, \ldots, \Delta y_k^{(i)})^T$$
$$= (x_1^{(i)}, x_2^{(i)}, \ldots, x_k^{(i)}, y_1^{(i)}, y_2^{(i)}, \ldots, y_k^{(i)})^T -$$
$$(x_1^{(i-1)}, x_2^{(i-1)}, \ldots, x_k^{(i-1)}, y_1^{(i-1)}, y_2^{(i-1)}, \ldots, y_k^{(i-1)})^T$$

$$S = \overline{S} + Uw$$

$$= (\overline{S} \ U)\begin{pmatrix} 1 \\ w \end{pmatrix};$$

by supposing the rotation angle is very small, $$\begin{pmatrix} X_i \\ Y_i \end{pmatrix} = s \begin{pmatrix} \cos(\theta) & \sin(\theta) \\ -\sin(\theta) & \cos(\theta) \end{pmatrix} \begin{pmatrix} \overline{S}_i^x & U_i^x \\ \overline{S}_i^y & U_i^y \end{pmatrix} \begin{pmatrix} 1 \\ w \end{pmatrix} + \begin{pmatrix} T_x \\ T_y \end{pmatrix}$$

$$= \begin{pmatrix} \cos(\theta) & \sin(\theta) \\ -\sin(\theta) & \cos(\theta) \end{pmatrix} \begin{pmatrix} \overline{S}_i^x & U_i^x \\ \overline{S}_i^y & U_i^y \end{pmatrix} \begin{pmatrix} s \\ sw \end{pmatrix} + \begin{pmatrix} T_x \\ T_y \end{pmatrix}$$

$$\approx \begin{pmatrix} 1 & \theta \\ -\theta & 1 \end{pmatrix} \begin{pmatrix} \overline{S}_i^x & U_i^x \\ \overline{S}_i^y & U_i^y \end{pmatrix} w' + \begin{pmatrix} T_x \\ T_y \end{pmatrix}; \text{ and}$$

by taking derivative of $X_i$, $Y_i$ with respect to $\theta$, T, and w', $$\begin{pmatrix} dX_i \\ dY_i \end{pmatrix} = \left[ \begin{pmatrix} \overline{S}_i^y & U_i^y \\ \overline{S}_i^x & -U_i^x \end{pmatrix} w' : \begin{matrix} 1 & 0 \\ 0 & 1 \end{matrix} : \begin{pmatrix} 1 & \theta \\ -\theta & 1 \end{pmatrix} \begin{pmatrix} \overline{S}_i^x & U_i^x \\ \overline{S}_i^y & U_i^y \end{pmatrix} \right] \begin{pmatrix} d\theta \\ \ldots \\ dT \\ \ldots \\ dw' \end{pmatrix}.$$

11. The method as defined in claim 1, wherein the CONDENSATION algorithm is performed separately on at least one reduced-size of the image prior to performing the CONDENSAILON algorithm on a full-size of the image.

12. The method as defined in claim 11, wherein the CONDENSATION algorithm is performed separately tbr a plurality of image resolutions starting from a low image resolution to a high image resolution.

13. The method as defined in claim 12, wherein the number of landmarks defining said model face shape is increased from the low image resolution to the high image resolution.

14. The method as defined in claim 13, wherein dimension of shape eigen-space arc also increased from the low image resolution to the high image resolution.

15. method as defined in claim 11, wherein the CONDENSATION algorithm is performed hierarchically on a plurality of image resolutions starting from a low image resolution to a high image resolution.

16. Method for performing a face localization in an image based on a Bayesian rule, comprising:

deriving a predefined face shape model m;

employing conditional density propagation (CONDENSATION) algorithm to locate a face shape in the image using a prior probabilistic distribution of a model p(m) based on said predefined face shape model m, and a local texture likelihood distribution given said predefined face shape model with specific model parameters p(I|m).

17. The method as defined in claim 16, wherein the CONDENSATION algorithm is performed separately on at least one reduced-size of the image prior to performing the CONDENSATION algorithm on a full-size of the image.

18. The method as defined in claim 16, wherein the a prior probabilistic distribution of a predefined model p(m) describes a 2-dimensional face shape represented as a vector, $$S=(x_1, x_2, \ldots, x_K, y_1, y_2, \ldots, y_K)^T$$

of length 2K, where K is a number of landmarks that define said face shape.

19. The method as defined in claim 18, wherein the face shape is modeled as a vector $$S = \bar{S} + Uw,$$

when aligned with at least one of a plurality of manually labeled face images by taking a first k principal components, where $\bar{S}$ is a mean face shape, and $U_{2K \times k}$ is an eigenvector matrix, and $w_{k \times 1}$ is a parameter vector that define said face shape S.

20. The method as defined in claim 19, wherein the a prior probabilistic distribution of a predefined model p(m) is obtained by learning a mixture of Gaussian model after projecting said face vector S in the k dimensional active shape model (ASM) eigenspace.

21. The method as defined in claim 20 wherein, said face shape vector S is rearranged as $$\hat{S} = \left\{ \begin{pmatrix} x_1 \\ y_1 \end{pmatrix}, \begin{pmatrix} x_2 \\ y_2 \end{pmatrix}, \ldots, \begin{pmatrix} x_k \\ y_k \end{pmatrix} \right\},$$

where ($\hat{\cdot}$) denotes the rearrangement operation of shape vector.

22. The method as defined in claim 21 wherein, said shape vector S is denoted as $$\hat{S}_{image} = s \begin{bmatrix} \cos(\theta) & \sin(\theta) \\ -\sin(\theta) & \cos(\theta) \end{bmatrix} \hat{S} + T,$$

where s is a scaling factor, θ is an angle of rotation, and $$T = \begin{bmatrix} T_x \\ T_y \end{bmatrix}$$

is the translation in the image, wherein the landmarks of the face in image is represented as parameter model $$m = (s, \theta, T, w).$$

23. The method as defined in claim 16, wherein the local texture likelihood distribution model p(I|m) is defined as $$p(I \mid m) = p(\Gamma_1, \Gamma_2, \ldots, \Gamma_K) = \prod_{j=1}^{K} p(\Gamma_j),$$

supposing the texture of each landmark is independent, and where $\Gamma_j$ denotes a sub-patch of landmark j defining a two-dimensional face shape;
wherein a texture likelihood p($\Gamma_j$) of landmark i is independently learned as a Mixture of Gaussian model of sub-patches of each landmark cropped from a plurality of manually labeled training images in the database projected into their customized feature subspaces.

24. The method as defined in claim 23, wherein $$I_i = \{\Gamma_1^{(i)}, \Gamma_2^{(i)}, \ldots, \Gamma_K^{(i)}\}$$

is a collection of local observation of facial features in image at interation i, and $$p(m_i \mid I_{i-1}) = p(p_1^{(i)}, p_2^{(i)}, \ldots, p_K^{(i)} \mid \Gamma_1^{(i-1)}, \Gamma_2^{(i-1)}, \ldots, \Gamma_K^{(i-1)})$$

$$= \prod_{j=1}^{K} p(p_j^{(i)} \mid \Gamma_j^{(i-1)}),$$

by regarding a predefined model $\{p_1, p_2, \ldots, p_K\}$ as a landmark set, and assuming independence of a $p(m_i/I_{i-1})$ of each of said landmark $p(p_j^{(i)} | \Gamma_j^{(i)})$;
said $p(m_i/I_{i-1})$ of each landmark is formulated as $$p(p_j \mid \Gamma_j) = \frac{p(p_j = (x, y) \mid \Gamma_{(x,y)})}{\sum_{(x,y) \in \Gamma_j} p(p_j = (x, y) \mid \Gamma_{(x,y)})},$$

where $\Gamma_{(x, y)}$ means a subpatch centered at (x, y); and $$p(p_j=(x,y)|\Gamma_{(x,y)}) \propto p(\Gamma_{(x,y)}|p_j=(x,y))p(p_j=(x,y)) = p(\Gamma_{(x,y)})p(p_j=(x,y))$$

where p($\Gamma_{(x, y)}$) is a texture likelihood of landmark j at location (x, y), and p($p_j$=(x, y)) is modeled as a uniform distribution in the image.

25. The method as defined in claim 24, wherein the formula $$p(p_j \mid \Gamma_j) = \frac{p(p_j = (x, y) \mid \Gamma_{(x,y)})}{\sum_{(x,y) \in \Gamma_j} p(p_j = (x, y) \mid \Gamma_{(x,y)})}$$

for the proposal model of each landmark is converted to model parameter space expressed by an equation, $$\Delta m^{(i)} = (\Delta s^{(i)}, \Delta \theta^{(i)}, \Delta T^{(i)}, \Delta w^{(i)}), \text{ and } m^{(i+1)} = m^{(i)} + a \Delta m^{(i)} \text{ for some } 0 < a <= 1.$$

26. The method as defined in claim 25, wherein said model parameter space equation is obtained from a new model sample proposed as $$\{p_1^{(i)}, p_2^{(i)}, \ldots, p_k^{(i)}\},$$

$$\Delta S^{(i)} = (\Delta x_1^{(i)}, \Delta x_2^{(i)}, \ldots, \Delta x_k^{(i)}, \Delta y_1^{(i)}, \Delta y_2^{(i)}, \ldots, \Delta y_k^{(i)})^T$$

$$= (x_1^{(i)}, x_2^{(i)}, \ldots, x_k^{(i)}, y_1^{(i)}, y_2^{(i)}, \ldots, y_k^{(i)})^T -$$

$$(x_1^{(i-1)}, x_2^{(i-1)}, \ldots, x_k^{(i-1)}, y_1^{(i-1)}, y_2^{(i-1)}, \ldots, y_k^{(i-1)})^T$$

$$S = \bar{S} + Uw$$

$$= (\bar{S} \; U) \begin{pmatrix} 1 \\ w \end{pmatrix};$$

by supposing the rotation angle is very small, $$\begin{pmatrix} X_i \\ Y_i \end{pmatrix} = s \begin{pmatrix} \cos(\theta) & \sin(\theta) \\ -\sin(\theta) & \cos(\theta) \end{pmatrix} \begin{pmatrix} \bar{S}_i^x & U_i^x \\ \bar{S}_i^y & U_i^y \end{pmatrix} \begin{pmatrix} 1 \\ w \end{pmatrix} + \begin{pmatrix} T_x \\ T_y \end{pmatrix}$$

$$= \begin{pmatrix} \cos(\theta) & \sin(\theta) \\ -\sin(\theta) & \cos(\theta) \end{pmatrix} \begin{pmatrix} \bar{S}_i^x & U_i^x \\ \bar{S}_i^y & U_i^y \end{pmatrix} \begin{pmatrix} s \\ sw \end{pmatrix} + \begin{pmatrix} T_x \\ T_y \end{pmatrix}$$

$$\approx \begin{pmatrix} 1 & \theta \\ -\theta & 1 \end{pmatrix} \begin{pmatrix} \bar{S}_i^x & U_i^x \\ \bar{S}_i^y & U_i^y \end{pmatrix} w' + \begin{pmatrix} T_x \\ T_y \end{pmatrix}; \text{ and}$$

by taking derivative of $X_i$, $Y_i$ with respect to θ, T, and w', $$\begin{pmatrix} dX_i \\ dY_i \end{pmatrix} = \left[ \begin{pmatrix} \bar{S}_i^y & U_i^y \\ \bar{S}_i^x & -U_i^x \end{pmatrix} w' : \begin{matrix} 1 & 0 \\ 0 & 1 \end{matrix} : \begin{pmatrix} 1 & \theta \\ -\theta & 1 \end{pmatrix} \begin{pmatrix} \bar{S}_i^x & U_i^x \\ \bar{S}_i^y & U_i^y \end{pmatrix} \right] \begin{pmatrix} d\theta \\ \ldots \\ dT \\ \ldots \\ dw' \end{pmatrix}.$$

* * * * *

UNITED STATES PATENT AND TRADEMARK OFFICE
CERTIFICATE OF CORRECTION

PATENT NO. : 7,454,039 B2
APPLICATION NO. : 10/889459
DATED : November 18, 2008
INVENTOR(S) : Tu et al.

It is certified that error appears in the above-identified patent and that said Letters Patent is hereby corrected as shown below:

Col. 3, line 43  Please delete " $(\hat{\tilde{\,\,}})$ " and insert -- $(\hat{\cdot})$ -- in its place.

Col. 4, line 12  Please delete "$(p(\theta_j)$" and insert -- $p(\Gamma_j)$ -- in its place.

Col. 4, line 48  Please delete "$p(\Gamma_{(x,y)j})$" and insert -- $p(\Gamma_{(x,y)_j})$ -- in its place.

Col. 4, line 49  Please delete "$p(\Gamma_{(x,y)j})$" and insert -- $p(\Gamma_{(x,y)_j})$ -- in its place.

Col. 5, line 23  Please delete the leftmost side of the formula:

" $\begin{pmatrix} dX_i \\ dY_i \end{pmatrix} = \left[ \begin{pmatrix} \overline{S}_i^y & U_i^y \\ \overline{S}_i^x & -U_i^x \end{pmatrix} \right.$ " and insert -- $\begin{pmatrix} dX_i \\ dY_i \end{pmatrix} = \left[ \begin{pmatrix} \overline{S}_i^y & U_i^y \\ -\overline{S}_i^x & -U_i^x \end{pmatrix} \right.$ -- in its place.

Claim 5, Col. 6, line 37  Please delete "detined" and insert -- defined -- in its place.

Claim 6, Col. 6, line 55  Please delete the capital "S" and insert a lowercase -- s -- in its place.

Claim 8, Col. 7, line 19  Please delete "I" and subscript number 1 ("$I_1$") and replace it with I and subscript lowercase i (-- $I_i$ --).

Claim 8, Col. 7, line 32  Please delete "predetined" and insert -- predefined -- in its place.

Claim 8, Col. 7, line 33  Please delete "$p(m/I_{i-1})$" and insert -- $p(m_i | I_{i-1})$ -- in its place.

Signed and Sealed this

Twenty-second Day of June, 2010

David J. Kappos
*Director of the United States Patent and Trademark Office*

CERTIFICATE OF CORRECTION (continued)
U.S. Pat. No. 7,454,039 B2

Claim 8, Col. 7, line 35 — Please delete "p(m/I$_{i-1}$)" and insert -- p(m$_i$ |I$_{i-1}$) -- in its place.

Claim 10, Col. 8, line 31 — Please delete the leftmost side of the formula:

" $\begin{pmatrix} dX_i \\ dY_i \end{pmatrix} = \left[ \begin{pmatrix} \overline{S}_i^y & U_i^y \\ \overline{S}_i^x & -U_i^x \end{pmatrix} \right.$ " and insert -- $\begin{pmatrix} dX_i \\ dY_i \end{pmatrix} = \left[ \begin{pmatrix} \overline{S}_i^y & U_i^y \\ -\overline{S}_i^x & -U_i^x \end{pmatrix} \right.$ -- in its place.

Claim 11, Col. 8, lines 38-39 — Please delete hyphenated word "CONDENSAILON" and insert -- CONDENSATION -- in its place.

Claim 12, Col. 8, line 41 — Please delete "tbr" and insert -- for -- in its place.

Claim 14, Col. 8, line 48 — Please delete "arc" and insert -- are -- in its place.

Claim 15, Col. 8, line 50 — Please insert -- The -- at the beginning of the claim.

Claim 22, Col. 9, line 43 — Please delete "m=(s,O,T,w)" and insert -- m=(s,θ,T,w) -- in its place.

Claim 24, Col. 10, line 16 — Please delete " ~ $p(\Gamma_{(x,y)|}p_j$ " and insert -- ~ $p(\Gamma_{(x,y)} | p_j$ -- in its place.

Claim 24, Col. 10, line 17 — Please delete " $p(\Gamma_{(x,y)j})$ " and insert -- $p(\Gamma_{(x,y)_j})$ -- in its place.

Claim 24, Col. 10, line 18 — Please delete " p$(\Gamma_{(x,y)j})$ " and insert -- p$(\Gamma_{(x,y)_j})$ -- in its place.

Claim 26, Col. 10, line 60 — Please delete the leftmost side of the formula:

" $\begin{pmatrix} dX_i \\ dY_i \end{pmatrix} = \left[ \begin{pmatrix} \overline{S}_i^y & U_i^y \\ \overline{S}_i^x & -U_i^x \end{pmatrix} \right.$ " and insert -- $\begin{pmatrix} dX_i \\ dY_i \end{pmatrix} = \left[ \begin{pmatrix} \overline{S}_i^y & U_i^y \\ -\overline{S}_i^x & -U_i^x \end{pmatrix} \right.$ -- in its place.